United States Patent
Kurachi et al.

(10) Patent No.: US 6,642,671 B2
(45) Date of Patent: Nov. 4, 2003

(54) ELECTRODELESS DISCHARGE LAMP

(75) Inventors: Toshiaki Kurachi, Osaka (JP); Satoshi Kominami, Osaka (JP); Kouji Miyazaki, Osaka (JP); Kenichirou Takahashi, Osaka (JP); Kenichi Sasaki, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/228,795

(22) Filed: Aug. 27, 2002

(65) Prior Publication Data

US 2003/0057877 A1 Mar. 27, 2003

(30) Foreign Application Priority Data

Aug. 27, 2001 (JP) ........................................ 2001-256936

(51) Int. Cl.[7] .............................................. H05B 41/16
(52) U.S. Cl. ........................................ 315/248; 313/46
(58) Field of Search ........................... 315/248, 51, 56, 315/326, 344; 313/46, 485, 317, 318.01, 318.12

(56) References Cited

U.S. PATENT DOCUMENTS 5,621,266 A * 4/1997 Popov et al. ................. 313/46
6,555,954 B1 * 4/2003 Chandler et al. ........... 315/248

FOREIGN PATENT DOCUMENTS

JP           10027576       * 1/1998

* cited by examiner

Primary Examiner—Don Wong
Assistant Examiner—Thuy Vinh Tran
(74) Attorney, Agent, or Firm—Snell & Wilmer, LLP

(57) ABSTRACT

An electrodeless discharge lamp includes: a bulb filled with discharge gas; an induction coil; a power supply circuit including a plurality of electric components; a case for accommodating the plurality of electric components; a stick-shaped heat conducting member; a first planar heat conducting member thermally connected to the stick-shaped heat conducting member; a second heat conducting member thermally connected to the first heat conducting member; and a third heat conducting member for thermally connecting at least two of the plurality of electric components, wherein the second heat conducting member is thermally connected to the case, and the thermal conductivity of the first heat conducting member is lower than the thermal conductivity of the stick-shaped heat conducting member and the thermal conductivity of the second heat conducting member.

37 Claims, 11 Drawing Sheets

ELECTRODELESS DISCHARGE LAMP

BACKGROUND OF THE INVENTION

1. Field of the Invention

The present invention relates to an electrodeless discharge lamp.

2. Description of the Related Art

In recent years, from the standpoint of protection of a terrestrial environment, resource saving has been advocated in various industries. An effective measure to save the resources for a lamp is to obtain a longer operating lifetime. An electrodeless discharge lamp has been receiving considerable attention because its operating lifetime is typically several times longer than that of a discharge lamp having an electrode with a filament.

The structure of an electrodeless discharge lamp is different from that of a conventional fluorescent lamp having a filament. For example, an electrodeless discharge lamp includes: an electrodeless bulb filled with a light emitting material; an induction coil for providing electromagnetic energy that excites the light emitting material (discharge gas) in the bulb so as to allow the material to emit light; and a high frequency power supply circuit for supplying high frequency electric power to the induction coil.

The core of the induction coil of the electrodeless discharge lamp includes a magnetic material. If the temperature of the magnetic core of the induction coil increases during a discharging operation of the lamp and exceeds a certain critical temperature (Curie temperature), the magnetic permeability of the magnetic core decreases so that the operation of the discharge lamp is stopped. Thus, the electrodeless discharge lamp should have a structure that decreases the temperature of the induction coil.

The electrodeless discharge lamp has a long operating lifetime, but the lifetime is not unlimited, because the lifetime of electric components used in the lamp is finite. The lifetime of the electric components depends on the temperature. Especially, the lifetime of an electrolytic capacitor used in the power supply circuit of the electrodeless discharge lamp largely varies according to its environmental temperature. As the environmental temperature increases by 10° C., the lifetime of the electrolytic capacitor is decreased by half, which is known as the "Arrhenius' 10-degree rule". Thus, the electrodeless discharge lamp should have a structure that decreases the temperature of the electric components.

Under such circumstances, considerable effort has been made to decrease the temperatures of the induction coil and the electric components incorporated in the electrodeless discharge lamp as much as possible.

For example, Japanese Utility Model Publication for Opposition No. 6-6448 discloses a known technique for decreasing the temperature of a magnetic core of an induction coil. According to this technique, a stick-shaped heat conducting member is incorporated in a central portion of a cross-section of the magnetic core along a longitudinal direction of the magnetic core for releasing heat generated in the induction coil. The stick-shaped heat conducting member is connected to a metal jacket, which is a casing of the induction coil, such that the heat conducted through the stick-shaped heat conducting member is radiated from the casing. The metal jacket extends from the lamp so as to radiate the heat.

In the above structure disclosed in Japanese Utility Model Publication for Opposition No. 6-6448, the heat generated in the magnetic core of the induction coil is transmitted to the metal jacket, which is a casing of the induction coil. This technique can decrease the temperature of the induction coil, but on the other hand, the temperature of the electric components included in the power supply circuit provided inside the casing is increased due to the heat transmitted to the casing.

Japanese Utility Model Publication for Opposition No. 6-6448 does not discuss issues concerning heat liberation from the electric components.

SUMMARY OF THE INVENTION

According to one aspect of the present invention, an electrodeless discharge lamp includes a bulb filled with discharge gas; an induction coil for generating an electromagnetic field in the bulb; a power supply circuit which includes a plurality of electric components and which supplies electric power to the induction coil; a case for accommodating the plurality of electric components, the case having a surface which faces an external element of the electrodeless discharge lamp; a stick-shaped heat conducting member placed along a winding axis of the induction coil; a first planar heat conducting member placed so as to be perpendicular to the winding axis, the first heat conducting member being thermally connected to the stick-shaped heat conducting member; a second heat conducting member thermally connected to the first heat conducting member; and a third heat conducting member for thermally connecting at least two of the plurality of electric components, wherein the second heat conducting member is thermally connected to the case, and the thermal conductivity of the first heat conducting member is lower than the thermal conductivity of the stick-shaped heat conducting member and the thermal conductivity of the second heat conducting member.

In one embodiment of the present invention, the first heat conducting member is made of an electrically insulative material.

In another embodiment of the present invention, the first heat conducting member is made of a ferrite material.

In still another embodiment of the present invention, the thermal conductivity of the first heat conducting member is between about 0.8 W/m·K and about 6 W/m·K inclusive; and the thermal conductivity of the stick-shaped heat conducting member and the second heat conducting member is between about 100 W/m·K and about 400 W/m·K inclusive.

According to another aspect of the present invention, an electrodeless discharge lamp includes: a bulb filled with discharge gas; an induction coil for generating an electromagnetic field in the bulb; a power supply circuit which includes a plurality of electric components and which supplies electric power to the induction coil; a case for accommodating the plurality of electric components, the case having a surface which faces an external element of the electrodeless discharge lamp; a stick-shaped heat conducting member placed along a winding axis of the induction coil; a second heat conducting member thermally connected to the stick-shaped heat conducting member at a joint surface; and a third heat conducting member for thermally connecting at least two of the plurality of electric components, wherein the second heat conducting member is thermally connected to the case, and a product of the thermal conductivity of the stick-shaped heat conducting member and the area of a cross-section of the stick-shaped heat conducting member which is perpendicular to a central axis of the stick-shaped heat conducting member is smaller than a product of the thermal conductivity of the second heat conducting member and the area of the joint surface.

In one embodiment of the present invention, the electrodeless discharge lamp further includes a reduction member placed between the induction coil and the second heat conducting member for reducing a thermal influence caused by an electromagnetic field generated by the induction coil on the second heat conducting member.

In another embodiment of the present invention, the reduction member is made of a ferrite material.

According to still another aspect of the present invention, an electrodeless discharge lamp includes: a bulb filled with discharge gas; an induction coil for generating an electromagnetic field in the bulb; a power supply circuit which includes a plurality of electric components and which supplies electric power to the induction coil; a case for accommodating the plurality of electric components, the case having a surface which faces an external element of the electrodeless discharge lamp; a stick-shaped heat conducting member placed along a winding axis of the induction coil; a first planar heat conducting member placed so as to be perpendicular to the winding axis, the first heat conducting member being thermally connected to the stick-shaped heat conducting member; a second heat conducting member thermally connected to the first heat conducting member; a third heat conducting member for thermally connecting at least two of the plurality of electric components; and a printed circuit board on which the plurality of electric components are placed, wherein the second heat conducting member is thermally connected to the case, the third heat conducting member is thermally connected to the case, and there is a space between the printed circuit board and the second heat conducting member.

According to still another aspect of the present invention, an electrodeless discharge lamp includes a bulb filled with discharge gas; an induction coil for generating an electromagnetic field in the bulb; a power supply circuit which includes a plurality of electric components and which supplies electric power to the induction coil; a case for accommodating the plurality of electric components, the case having a surface which faces an external element of the electrodeless discharge lamp; a stick-shaped heat conducting member placed along a winding axis of the induction coil; a first planar heat conducting member placed so as to be perpendicular to the winding axis, the first heat conducting member being thermally connected to the stick-shaped heat conducting member; and a second heat conducting member thermally connected to the first heat conducting member, wherein the second heat conducting member is in contact with the case at a surface contact portion.

In one embodiment of the present invention, the electrodeless discharge lamp further includes a third heat conducting member for thermally connecting at least two of the plurality of electric components with each other.

In another embodiment of the present invention, the second heat conducting member is pressed into the case.

In still another embodiment of the present invention, the second heat conducting member is in contact with the case at the surface contact portion through thermally conductive grease.

In still another embodiment of the present invention, the thermal conductivity of the thermally conductive grease is between about 0.2 W/m·K and about 6 W/m·K inclusive.

In still another embodiment of the present invention, the induction coil includes a magnetic core having a hollow portion; and the stick-shaped heat conducting member is fitted in the hollow portion of the magnetic core.

In still another embodiment of the present invention, the stick-shaped heat conducting member is provided so as to envelop the induction coil.

In still another embodiment of the present invention, the case is made of a resin material.

In still another embodiment of the present invention, the plurality of electric components include an electrolytic capacitor; and the electrolytic capacitor is placed so as not to be in contact with the third heat conducting member.

In still another embodiment of the present invention, the case has a base for receiving a commercial electric power which is to be supplied to the plurality of electric components; and the electrolytic capacitor is placed such that at least a portion of the electrolytic capacitor is within the base.

In still another embodiment of the present invention, the thermal conductivity of the third heat conducting member is between about 0.2 W/m·K and about 4 W/m·K inclusive.

Thus, the invention described herein makes possible the advantages of providing an electrodeless discharge lamp wherein the temperature of a magnetic core of an induction coil is maintained to be equal to or smaller than its critical temperature while an increase in temperature of electric components is suppressed.

These and other advantages of the present invention will become apparent to those skilled in the art upon reading and understanding the following detailed description with reference to the accompanying figures.

BRIEF DESCRIPTION OF THE DRAWINGS

FIG. 11C shows the second heat conducting member 33a and the case 50 which has been pressed into the member 33a.

FIG. 11D shows another exemplary shape of the second heat conducting member 33a.

DESCRIPTION OF THE PREFERRED EMBODIMENTS

Hereinafter, embodiments of the present invention will be described with reference to the drawings.

First, the principle of the present invention is described. As previously described, an objective of the present invention is to maintain the temperature of a magnetic core of an induction coil to be equal to or smaller than its critical temperature while an increase in temperature of electric components is suppressed. To this end, thermal transmission between the induction coil and the electric components is appropriately controlled.

Figure 1:
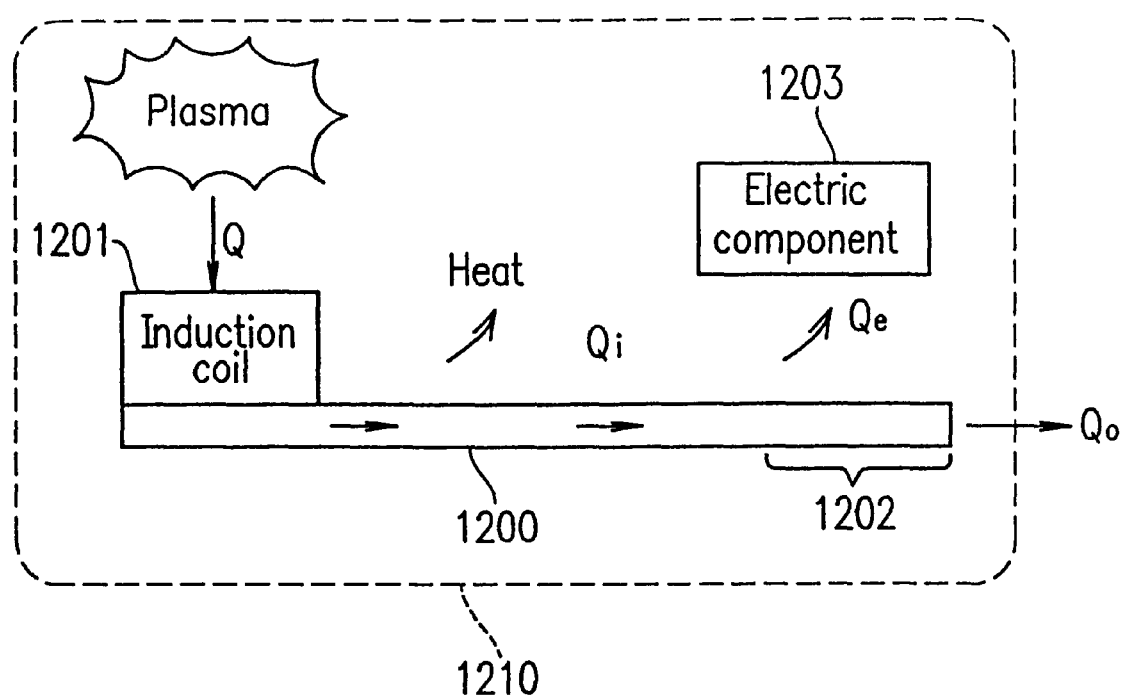
FIG. 1 schematically illustrates transmission of heat in an electrodeless discharge lamp 1210.

FIG. 1 schematically illustrates transmission of heat in an electrodeless discharge lamp 1210. The electrodeless discharge lamp 1210 includes an induction coil 1201 and an electric component 1203. In FIG. 1, for the purpose of clearly illustrating the principle of the present invention, the structure and the components of the actual electrodeless discharge lamp are schematically simplified.

The induction coil 1201 is heated by plasma which is generated during operation of the electrodeless discharge lamp 1210. In the description below, assume that the quantity of heat provided by the plasma to the induction coil 1201 within a unit time is represented by Q. The unit of the heat quantity Q is arbitrary. The induction coil 1201 is connected to a heat conducting member 1200. The heat conducting member 1200 removes heat from the induction coil 1201 by conducting the heat therethrough, and radiates the heat out of the electrodeless discharge lamp 1210.

In the example illustrated in FIG. 1, an electric component 1203 is placed in the vicinity of a portion 1202 of the heat conducting member 1200. A certain quantity of heat $Q_i$ is introduced into the portion 1202 from the induction coil side (left-hand side of FIG. 1) within the unit of time. A portion of the heat $Q_i$ which has quantity $Q_e$ is transmitted to the electric component 1203, and heat having quantity $Q_o$ is radiated out of the electrodeless discharge lamp 1210.

In this specification, the following three principles for suppressing an increase in temperature of the electric component 1203 are considered.

Principle A: The quantity of heat $Q_i$, which is introduced into the portion 1202 through the heat conducting member 1200, is reduced. Accordingly, the quantity of heat $Q_e$ transmitted to the electric component 1203 is reduced, and as a result, an increase in temperature of the electric component 1203 is suppressed. Herein, this principle is referred to as a "conduction-suppressing" principle.

Principle B: The quantity of heat $Q_o$, which is radiated out of the electrodeless discharge lamp 1210, is increased. Accordingly, the quantity of heat $Q_e$ transmitted to the electric component 1203 is reduced, and as a result, an increase in temperature of the electric component 1203 is suppressed. Herein, this principle is referred to as an "accelerated-radiation" principle.

Principle C: Heat transmission from the heat conducting member 1200 to the electric component 1203 is suppressed (the heat conducting member 1200 and the electric component 1203 are thermally separated). Accordingly, the quantity of heat $Q_e$ transmitted to the electric component 1203 is reduced, and as a result, an increase in temperature of the electric component 1203 is suppressed. Herein, this principle is referred to as a "separation" principle.

Hereinafter, embodiments of the present invention are described with reference to the attached drawings.

(Embodiment 1)

Figure 2:
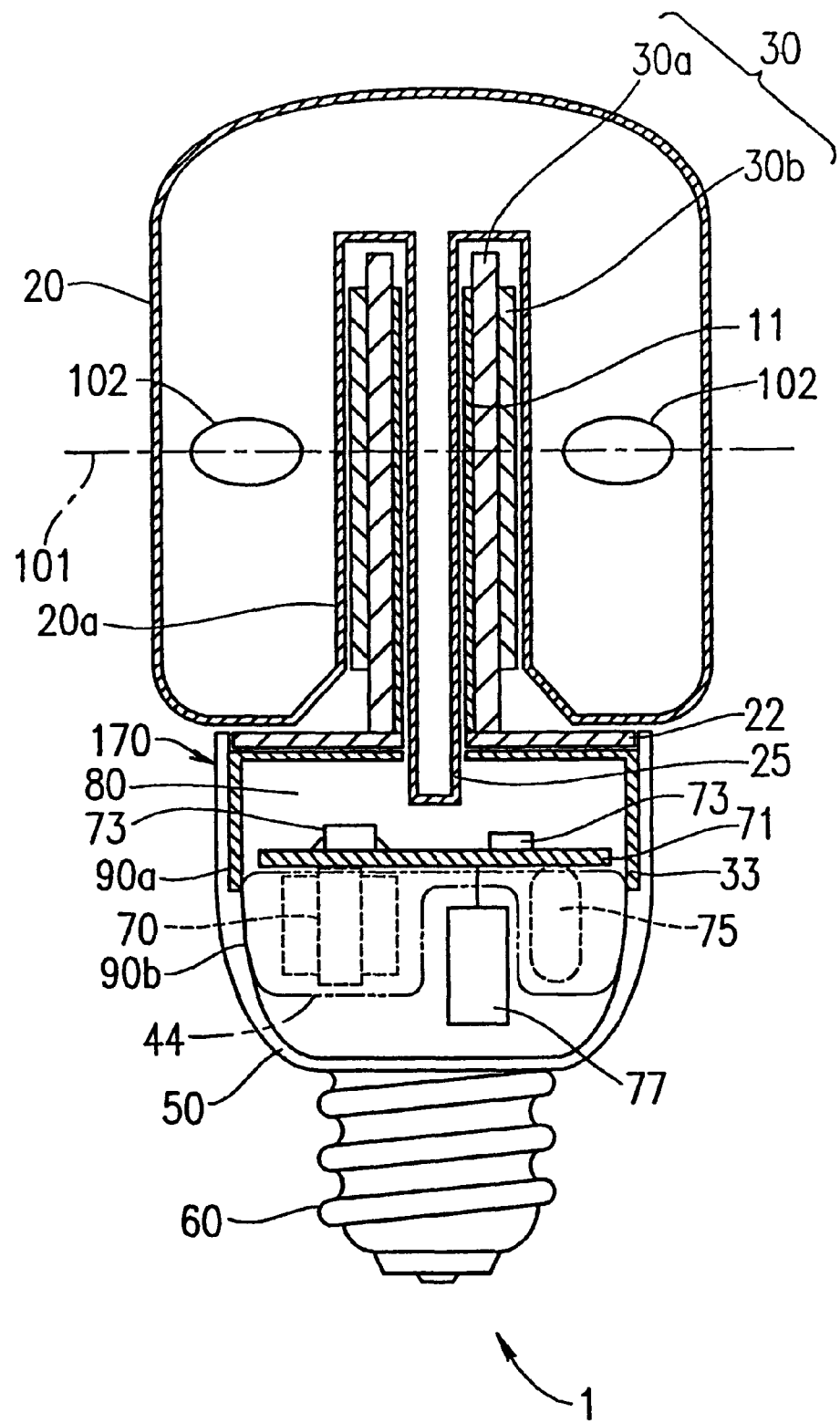
FIG. 2 shows an electrodeless discharge lamp 1 according to embodiment 1 of the present invention.

FIG. 2 shows an electrodeless discharge lamp 1 according to embodiment 1 of the present invention. The electrodeless discharge lamp 1 includes a bulb 20, an induction coil 30, and a case 50. The case 50 accommodates a printed circuit board 71.

The bulb 20 is made of a light transmitting material (e.g., soda-lime glass). The inside of the bulb 20 is filled with a discharge gas (e.g., rare gas such as mercury, argon, etc.) as a light emitting material.

The internal surface of the bulb 20 is provided with a phosphor layer (not shown). Ultraviolet radiation generated by excitation of mercury in the bulb 20 is converted to visible radiation by this phosphor layer.

The bulb 20 has a reentrant cavity 20a. An induction coil 30 is placed in the reentrant cavity 20a. The induction coil 30 includes a magnetic core 30a having a generally-hollow cylindrical shape, and a coil 30b wound around the magnetic core 30a in a generally-solenoid shape. The magnetic core 30a is made of, for example, a magnetic material (e.g., ferrite).

A power supply circuit 70 is formed on the printed circuit board 71. The power supply circuit 70 is connected to the coil 30b such that the power supply circuit 70 supplies a high frequency current (power) to the coil 30b. The power supply circuit 70 includes a plurality of electronic components (electric components), such as a semiconductor device, a capacitor, a resistive element, a choke coil, etc. The plurality of electric components include electric components 73 formed on a surface of the printed circuit board 71 which faces the bulb 20, and electric components 75 formed on a surface of the printed circuit board 71 which faces the base 60.

The case 50 is made of a heat-resistant resin having a high electrical insulation property (e.g., polybutylene terephthalate). From the experimentation conducted by the present inventors, it was found that using a resin material for the case 50 is preferable for suppressing an increase in temperature of the power supply circuit 70 accommodated in the case 50 in comparison to when a metal material is used for the case 50.

The case 50 has a surface 170 which can be in contact with an external element different from the electrodeless discharge lamp 1 (e.g., ambient air). Further, the case 50 has the base 60. The base 60 receives a commercial electric power to be supplied to the power supply circuit 70 (including a plurality of components).

The magnetic core 30a has a hollowed portion. A stick-shaped heat conducting member 11 having a high thermal conductivity is fitted in the hollowed portion of the magnetic core 30a along a winding axis of the induction coil 30. The "winding axis" refers to a central axis around which the coil 30b is wound in a generally-solenoid shape. The stick-shaped heat conducting member 11 is made of, for example, copper(thermal conductivity: about 400 W/m·K), and is placed so as to be in contact with the inside of the magnetic core 30a. With such a structure, the stick-shaped heat conducting member 11 is thermally connected to the magnetic core 30a of the induction coil 30.

The inside of the stick-shaped heat conducting member 11 is hollow so that an exhaust pipe 25 which is used for evacuating the bulb 20 passes therethrough. However, if the exhaust pipe 25 of the bulb 20 is provided at a position distant from the reentrant cavity 20a, the stick-shaped heat conducting member 11 may be solid. A cross-section of the stick-shaped heat conducting member 11 may have a cylindrical shape or may have a prismatic shape.

At the bottom of the bulb 20, a first planar heat conducting member 22 is provided so as to be perpendicular to the winding axis of the induction coil 30. The first heat conducting member 22 is a disk-shaped member made of ferrite, for example.

The stick-shaped heat conducting member 11 is in contact with the first heat conducting member 22 at the bottom of the bulb 20. That is, the stick-shaped heat conducting member 11 is thermally connected to the first heat conducting member 22. In this specification, when two elements are "thermally connected", the elements are placed such that heat can be transmitted therebetween regardless of whether or not they are in physical contact with each other.

The first heat conducting member 22 is coupled to a second heat conducting member 33. That is, the first heat conducting member 22 is thermally connected to the second heat conducting member 33. The present invention is not limited to an arrangement where the first heat conducting member 22 and the second heat conducting member 33 are in direct contact with each other. The first heat conducting member 22 and the second heat conducting member 33 may be thermally connected via another thermally conductive member.

The second heat conducting member 33 has a shape of "a disk with a skirt" or a shape of "a plant pot with a water drainage hole". The second heat conducting member 33 is made of, for example, copper (thermal conductivity: about 400 W/m·K).

The second heat conducting member 33 is thermally connected to the case 50. In the example illustrated in FIG. 2, the second heat conducting member 33 is thermally connected to the case 50 at a contact portion 90a. The printed circuit board 71 is placed within a space defined by the case 50 and the second heat conducting member 33 so as to face the second heat conducting member 33.

The first heat conducting member 22 may be thermally connected to the case 50.

The second heat conducting member 33 and the printed circuit board 71 are positioned such that a space 80 is secured therebetween.

A coating of a third heat conducting member 44 is formed using a mold so as to cover two or more of the electric components 75 formed on the base side surface of the printed circuit board 71, so that the covered components are thermally connected to each other. As the third heat conducting member 44, a thermally conductive resin having a high electrical insulating property and low hardness (e.g., thermally conductive silicon) is preferable. The third heat conducting member 44 is in contact with the case 50 at a contact portion 90b. That is, the third heat conducting member 44 is thermally connected to the case 50.

The operation of the electrodeless discharge lamp 1 having the above structure is now described. The power supply circuit 70 operates based on a commercial electric power supplied through the base 60. The power supply circuit 70 converts the commercial electric power to an alternating current of a high frequency (e.g., from several tens of kilohertz (kHz) to several tens of megahertz (MHz)) and supplies the alternating current to the coil 30b. Due to the alternating current supplied to the coil 30b, the induction coil 30 generates a magnetic field. This magnetic field generates an electric field within the bulb 20. The light emitting material (e.g., mercury and argon) in the bulb 20 is excited by the electric field so as to emit ultraviolet radiation. This ultraviolet radiation is converted by the phosphor layer (not shown) into visible radiation, and the visible radiation is released toward outside through the bulb 20. This emission principle employed in the present invention is the same as the conventional emission principle.

The electric field generated by the induction coil 30 is strongest on a cross-sectional plane 101 (indicated by a dashed line) which crosses the induction coil 30 at right angles at a longitudinal central portion of the induction coil 30. In the bulb 20, the plasma is generated near the plane 101 in the form of a ring (indicated by reference numeral 102). A portion of the coil 30b of the induction coil 30 which is near the plasma is heated mainly by heat from the plasma.

It is preferable that the induction coil 30 (the magnetic core 30a and the coil 30b) is operated at 200° C. or lower for the following reasons:

The Curie temperature of ferrite which is widely employed as the material of the magnetic core 30a is around 220° C. When this temperature is exceeded, the magnetic permeability of the ferrite significantly decreases, so that the inductance of the induction coil is decreased, and the plasma disappears; and The heat-resistible temperature of the insulating layer covering the coil 30b is around 200° C. When this temperature is exceeded, the insulating layer of the coil 30b is deteriorated, so that the induction coil 30 does not operate normally.

According to embodiment 1, in order to achieve the operation of the induction coil 30 at 200° C. or lower, the electrodeless discharge lamp 1 is provided with the stick-shaped heat conducting member 11, the first heat conducting member 22, the second heat conducting member 33, and the third heat conducting member 44. The stick-shaped heat conducting member 11, the first heat conducting member 22, and the second heat conducting member 33 integrally function as the heat conducting member 1200 shown in FIG. 1. The second heat conducting member 33 corresponds to the portion 1202 shown in FIG. 1.

1. Functions of Stick-Shaped Heat Conducting Member, First Heat Conducting Member, and Second Heat Conducting Member Now, the functions of the stick-shaped heat conducting member 11, the first heat conducting member 22, and the second heat conducting member 33 are described.

During the operation of the electrodeless discharge lamp 1, discharge gas is excited by an electric field which is generated by a magnetic field generated by the induction coil 30. The largest heat generated in the electrodeless discharge lamp 1 is heat produced from plasma generated by excitation of the discharge gas. A little over a half of the heat produced from the plasma is radiated out of the electrodeless discharge lamp 1 in the form of radiation or convection through the bulb 20. A little under half of the heat produced from the plasma is transmitted to the induction coil 30. Almost all of the heat transmitted to the induction coil 30 is transmitted to the stick-shaped heat conducting member 11 which has high thermal conductivity. The heat transmitted to the stick-shaped heat conducting member 11 is further transmitted to the first heat conducting member (ferrite disk) 22. Then, the heat is transmitted from the first heat conducting member 22 through its contact surface to the second heat conducting member 33 which has high thermal conductivity, and then transmitted to the case 50 through the contact portion 90a. The heat transmitted to the case 50 is radiated to external atmosphere through a surface 170 which is exposed to the external atmosphere.

Electrically insulative ferrite is used for the first heat conducting member 22. As described above, the thermal conductivity of ferrite (about 5 W/m·K) is smaller than that of copper (about 400 W/m·K). However, the thermal conductivity of ferrite is larger than that of air (about 0.03 W/m·K). In this way, a material having an intermediate thermal conductivity is used for the first heat conducting member 22, whereby heat transmitted through "the induction coil 30 the stick-shaped heat conducting member 11→the first heat conducting member 22→the second heat conducting member 33" can be reduced. Thus, an increase in temperature of the electric components included in the power supply circuit 70 can be suppressed according to the "conduction-suppressing" principle (Principle A) which was described above with reference to FIG. 1.

As a matter of course, in view of the purpose of "suppressing an increase in temperature of the electric components included in the power supply circuit 70", a smaller thermal conductivity of the first heat conducting member 22 is more preferable. However, when the thermal conductivity of the first heat conducting member 22 is too low, the quantity of heat removed from the induction coil 30 is decreased. As a result, the temperature of the induction coil 30 is undesirably increased.

On the other hand, the stick-shaped heat conducting member 11 and the second heat conducting member 33 are made of a material having high thermal conductivity (e.g., copper). The thermal conductivity is defined as a value obtained by dividing the quantity of heat transmitted through a unit cross-sectional area within a unit time by the temperature gradient along the cross-section. Thus, if the quantity of heat transmitted through a unit cross-sectional area within a unit time is constant, a material of a higher thermal conductivity has a smaller temperature gradient. That is, the temperature of the material becomes uniform. Since the temperature becomes uniform throughout the stick-shaped heat conducting member 11, the temperature of a portion of the magnetic core 30a which is in contact with the stick-shaped heat conducting member 11 is prevented from locally increasing. Further, since the temperature becomes uniform throughout the second heat conducting member 33, the temperature of the printed circuit board 71 which is provided so as to face the second heat conducting member 33 is prevented from locally increasing.

As a material of the stick-shaped heat conducting member 11 and the second heat conducting member 33, for example, copper, which is a metal having a highest thermal conductivity, may be used. Furthermore, a material (metal material) other than copper which has thermal conductivity between about 100 W/m·K and about 400 W/m·K inclusive, such as gold, aluminum, brass, molybdenum, etc., may also be employed. It should be noted that a material having thermal conductivity of 400W/m·K or greater may be used as the material of the stick-shaped heat conducting member 11 and the second heat conducting member 33.

In this way, the thermal conductivity of the first heat conducting member 22 is set to be lower than the thermal conductivities of the stick-shaped heat conducting member 11 and the second heat conducting member 33.

It is preferable that an electrically insulating material is used as a material of the first heat conducting member 22 in order to prevent a magnetic field generated by the induction coil 30 from generating an eddy current. In the case where an electrically conductive material (e.g., copper) is used as the material of the first heat conducting member 22, an eddy current is generated in the first heat conducting member 22, and accordingly, Joule heat is generated. As a result, the quantity of heat confined in the space near the printed circuit board 71 is increased, and the temperature of the electric components 73 and 75 increases, accordingly.

As described above, it is preferable that the material of the first heat conducting member 22 has an intermediate thermal conductivity and an electrical insulating property. One material which satisfies such conditions is ferrite.

The present inventors measured the temperature of the printed circuit board 71 in a prototype of the electrodeless discharge lamp 1 where the first heat conducting member 22 is formed by a thin ferrite disk and in another prototype of the electrodeless discharge lamp 1 where the first heat conducting member 22 is formed by a thin copper disk. When the ferrite was used as the first heat conducting member 22, the temperature of the printed circuit board 71 was 114° C.; when copper was used as the first heat conducting member 22, the temperature of the printed circuit board 71 was 145° C. As seen from this measurement example, when a material having a high thermal conductivity, such as copper, is used as the first heat conducting member 22, the quantity of heat transmitted from the induction coil 30 to the second heat conducting member 33 excessively increases so that the temperature of the printed circuit board 71 is increased. This is undesirable in view of suppressing an increase in temperature of the electric components.

Thus, according to embodiment 1 of the present invention, the stick-shaped heat conducting member 11, the first heat conducting member 22, and the second heat conducting member 33 function so as to suppress an increase in temperature of the electric components according to the above-described "conduction-suppressing" principle (Principle A).

2. Function of Third Heat Conducting Member

Next, functions and effects of the space 80 and the third heat conducting member 44 are described.

The temperature of the electric components 73 and 75 formed on the printed circuit board 71 are mainly determined by heat transmitted by the second heat conducting member 33 and heat generated by the electric components 73 and 75 themselves. Due to the space 80 provided between the printed circuit board 71 and the second heat conducting member 33, heat is not readily transmitted from, the second heat conducting member 33 to the printed circuit board 71. This is because air that fills the space 80 between the printed circuit board 71 and the second heat conducting member 33 has very low thermal conductivity (about 0.03 W/m·K).

However, the space 80 itself does not sufficiently serve to radiate heat generated by the printed circuit board 71 and the electric components 73 and 75 themselves. According to the experimentation of the present inventors, when another means for releasing heat generated by the electric components 73 and 75 is not provided, the temperature of one of the electric components formed on the printed circuit board 71 resulted in about 123° C.

In the electrodeless discharge lamp 1, the printed circuit board 71 and two or more of the electric components 75 (electric components formed on a surface of the printed circuit board 71 which is closer to the base 60), which are parts of the power supply circuit 70, are covered with the third heat conducting member 44. The third heat conducting member 44 is, for example, thermally conductive silicon resin. The third heat conducting member 44 is thermally connected to the case 50 at the contact portion 90b, so that heat of the electric components 75 and the printed circuit board 71 is transmitted to the case 50. As a result, the temperature of the printed circuit board 71 is decreased, and accordingly, the quantity of heat radiated from the electric components 73 (electric components formed on a surface of the printed circuit board 71 which is closer to the bulb 20)to the printed circuit board 71 is increased. According to the experimentation of the present inventors, the temperature of the electric components 73 was 98° C. during the operation of the electrodeless discharge lamp 1, while the temperature of the induction coil 30 was 131° C. This temperature of the induction coil 30, 131° C., is sufficiently lower than the use limit temperature of the induction coil 30, i.e., 200° C.

In this way, the third heat conducting member 44 thermally connects two or more of multiple electric components, whereby achieving a function of making the temperature of the plurality of thermally connected electric components uniform (component temperature uniforming function) and a function of radiating heat generated in the thermally connected electric components out of the electrodeless discharge lamp 1 through the case 50 (component heat radiating function). Due to the component temperature uniforming function of the third heat conducting member 44, the temperature of the electric components 73 and 75 included in the power supply circuit 70 can be maintained so as to be uniform, and accordingly, the temperature of an electric component which produces a much larger quantity of heat can be decreased in comparison to the other components. In view of enhancing the component heat radiating function, it is preferable to increase the area of the contact portion 90b as large as possible.

Due to the functions of the space 80 and the third heat conducting member 44, an increase in temperature of electric components can be suppressed according to the above-described "separation" principle (Principle C). As a result, the temperature of the electric components 73 and 75 can be maintained to be equal to or lower than a use limit temperature which is determined for each electric component in view of characteristics of the component, such as operation reliability, operating lifetime, etc.

As described above, in a preferred embodiment of the electrodeless discharge lamp 1, an increase in temperature of the electric components is suppressed according to the "conduction-suppressing" principle (Principle A), which is achieved by the stick-shaped heat conducting member 11, the first heat conducting member 22, and the second heat conducting member 33, and the "separation" principle (Principle C), which is achieved by the functions of the space 80 and the third heat conducting member 44. However, when principle A is used (i.e., when the thermal conductivity of the first heat conducting member 22 is lower than the thermal conductivities of the stick-shaped heat conducting member 11 and the second heat conducting member 33), provision of the space 80 and a thermal connection between the third heat conducting member 44 and the case 50 are not indispensable requirements. Even in such a case, so long as two or more of the electric components are thermally connected to each other, the temperature of the thermally connected electric components can be maintained to be equal to or lower than the use limit temperature thereof.

Further, when principle C is used (i.e., when the space 80 is secured and the third heat conducting member 44 is thermally connected to the case 50), it is not an indispensable requirement to define the thermal conductivities of the stick-shaped heat conducting member 11, the first heat conducting member 22, and the second heat conducting member 33.

Figure 3:
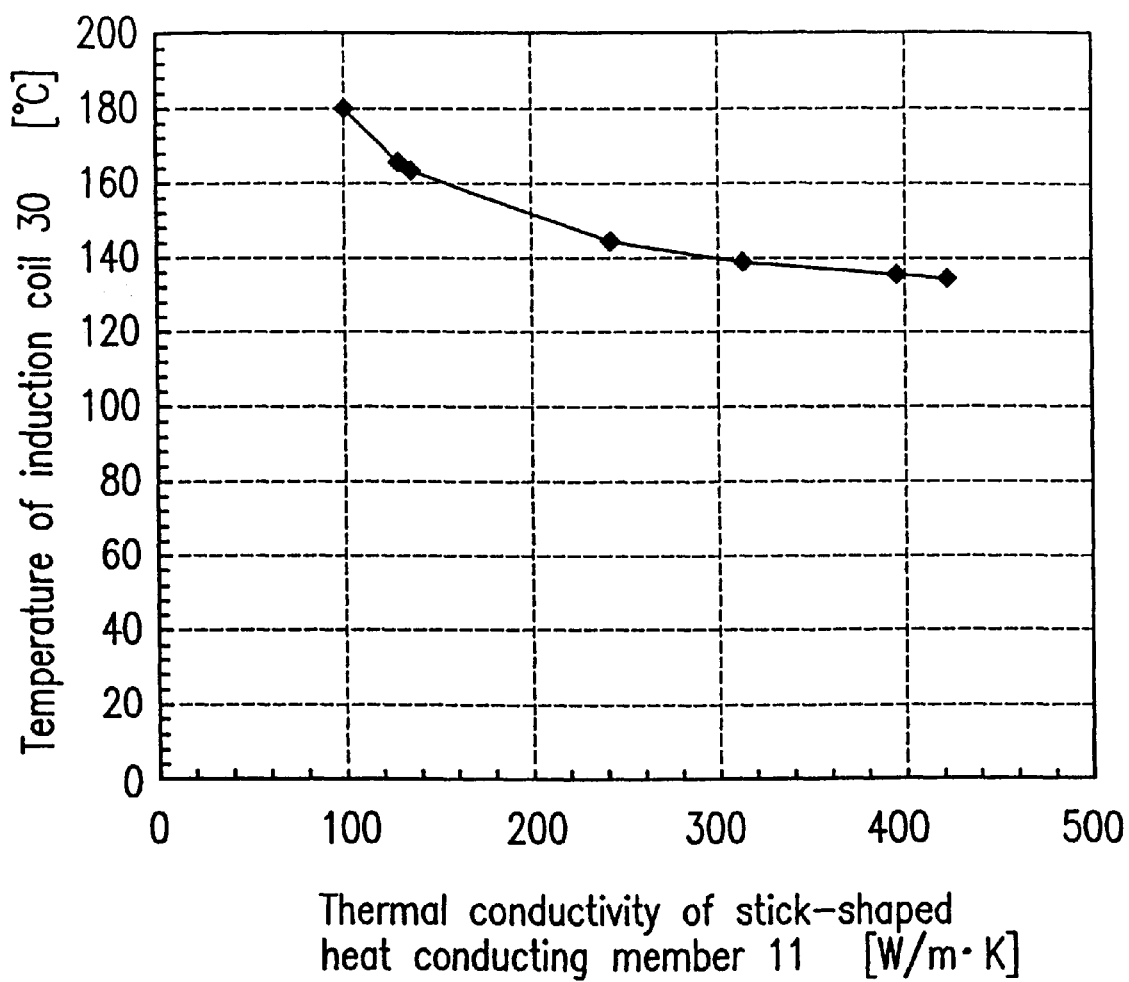
FIG. 3 shows a relationship between the temperature of an induction coil 30 and a thermal conductivity of a stick-shaped heat conducting member 11 of the electrodeless discharge lamp 1 when the dimensions of the stick-shaped heat conducting member 11 are constant.

FIG. 3 shows the relationship between the temperature of the induction coil 30 and the thermal conductivity of the stick-shaped heat conducting member 11 when the dimensions of the stick-shaped heat conducting member 11 are constant. As seen from FIG. 3, as the thermal conductivity of the stick-shaped heat conducting member 11 increases, the temperature of the induction coil 30 decreases. By increasing the cross-sectional area of the stick-shaped heat conducting member 11, the thermal conductivity of the stick-shaped heat conducting member 11 can be increased. However, in the case where the cross-sectional area of the stick-shaped heat conducting member 11 is increased, the weight of the entire electrodeless discharge lamp 1 is increased, and the space for providing the exhaust pipe 25 is eliminated.

Thus, it is preferable that the stick-shaped heat conducting member 11 be made of a metal material having a high thermal conductivity. A preferable thermal conductivity range of the metal material used is between about 100 W/m·K and about 400 W/m·K inclusive, as described above.

The first heat conducting member 22 is preferably made of ferrite, as described above, which has high electrical insulating property and an intermediate thermal conductivity. For example, the first heat conducting member 22 may be made of a composite material which is produced by curing resin containing ferrite powder. The thermal conductivity of the composite material changes within a range of about 0.8 W/m·K to about 6 W/m·K inclusive, according to the amount of ferrite powder contained.

Figure 4:
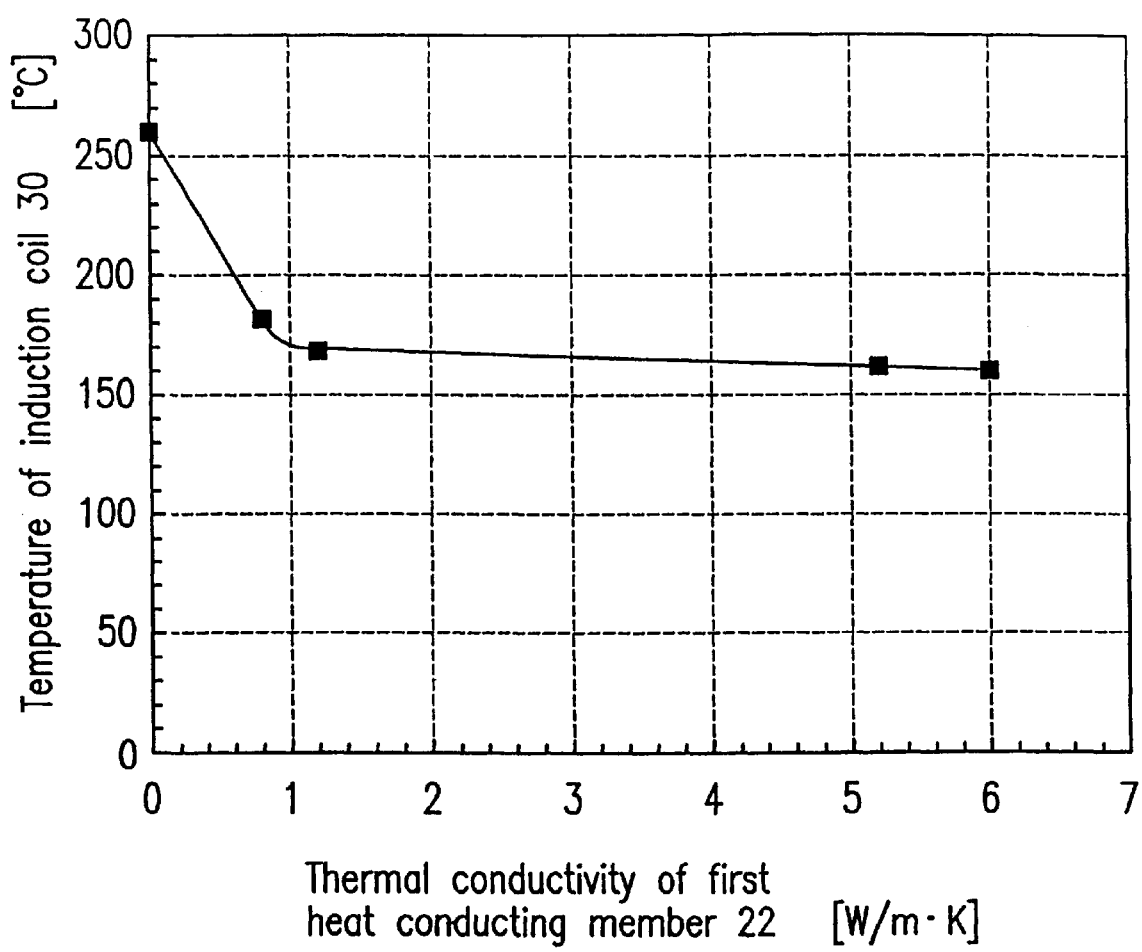
FIG. 4 shows a relationship between the temperature of the induction coil 30 and the thermal conductivity of a first heat conducting member 22 of the electrodeless discharge lamp 1.

FIG. 4 shows the relationship between the temperature of the induction coil 30 and the thermal conductivity of the first heat conducting member 22. In FIG. 4, the zero (0) point over the scale of thermal conductivity (horizontal axis) corresponds to a case where the first heat conducting member 22 is not provided, and instead, air is present. As seen from FIG. 4, in a very low thermal conductivity range (thermal conductivity is smaller than 0.8 W/m·K), the temperature of the induction coil 30 largely varies according to the thermal conductivity of the first heat conducting member 22. In a thermal conductivity range of 0.8 W/m·K or more, the temperature of the induction coil 30 does not vary much. Thus, in view of decreasing the temperature of the induction coil 30, the thermal conductivity of the induction coil 30 only needs to be about 0.8 W/m·K or more. A practical upper limit of the thermal conductivity of the first heat conducting member 22 is about 6 W/m·K, which is a thermal conductivity of sintered ferrite.

The third heat conducting member 44 is preferably made of a material having a high electrical insulating property and low hardness, such as thermally conductive silicon resin. Alternatively, for example, thermally resistant urethane may be used. However, if the third heat conducting member 44 is made of a resin material having high hardness, stress is caused in electric components covered with the third heat conducting member 44 (e.g., a ceramic capacitor), and as a result, some problems may occur. For example, the characteristics of an electric component may be varied; a magnetic core may crack due to expansion/contraction of a resin material undesirably introduced into a gap portion of a choke coil which has a gap, such as an EI core, an EE core, or the like; and the inductance of an electric component may be varied. For such reasons, it is preferable that the third heat conducting member 44 be made of a material having elasticity and low hardness.

The thermal conductivity of the third heat conducting member 44 is preferably about 0.2 W/m·K or more. A practical upper limit of the thermal conductivity of the third heat conducting member 44 is about 4 W/m·K or less.

3. Positioning of Electrolytic Capacitor

Referring again to FIG. 2, a preferred positioning example of the plurality of electronic components included in the power supply circuit 70 of the electrodeless discharge lamp 1 is described. FIG. 2 shows an electrolytic capacitor 77 included in the power supply circuit 70. As previously described, the lifetime of the electrolytic capacitor 77 largely depends on the environmental temperature. Thus, in order to extend the lifetime of the electrodeless discharge lamp 1, it is necessary to decrease the temperature of the electrolytic capacitor 77 during the operation of the electrodeless discharge lamp 1 as low as possible.

Inside the case 50 of the electrodeless discharge lamp 1, the space under the printed circuit board 71 (i.e., the space closer to the base 60) is less influenced by heat generated from the plasma 102 in comparison to the space above the printed circuit board 71 (i.e., the space closer to the bulb 20). Thus, in order to maintain the temperature of the electrolytic capacitor 77 to be low, it is preferable to provide the electrolytic capacitor 77 in the space under the printed circuit board 71 which is closer to the base 60.

During the operation of the electrolytic capacitor 77, a chemical reaction occurs inside the electrolytic capacitor 77, gas generated from this chemical reaction is released out of the electrolytic capacitor 77. If the electrolytic capacitor 77 is entirely covered with the third heat conducting member 44, the pressure of the generated gas increases, and the operation of the electrolytic capacitor 77 may become unstable. Furthermore, the temperature of the electrolytic capacitor 77 is preferably kept lower than the temperature of the other electric components included in the power supply circuit 70. It is not preferable that the electrolytic capacitor 77 is thermally connected to the other electric components, and the temperature of the electrolytic capacitor 77 and the other electric components is made uniform.

Thus, in the electrodeless discharge lamp 1, it is preferable that the electrolytic capacitor 77 is positioned so as not to be in contact with the third heat conducting member 44. In the example illustrated in FIG. 2, the coating of the third heat conducting member 44 is provided over the electric components formed on the printed circuit board 71 except for the electrolytic capacitor 77, whereby the operation reliability of the electrolytic capacitor 77 is increased, and the lifetime of the electrolytic capacitor 77 is extended.

More preferably, the electrolytic capacitor 77 is positioned in the vicinity of the base 60. In such a case, the temperature of the electrolytic capacitor 77 is further decreased.

Figure 5:
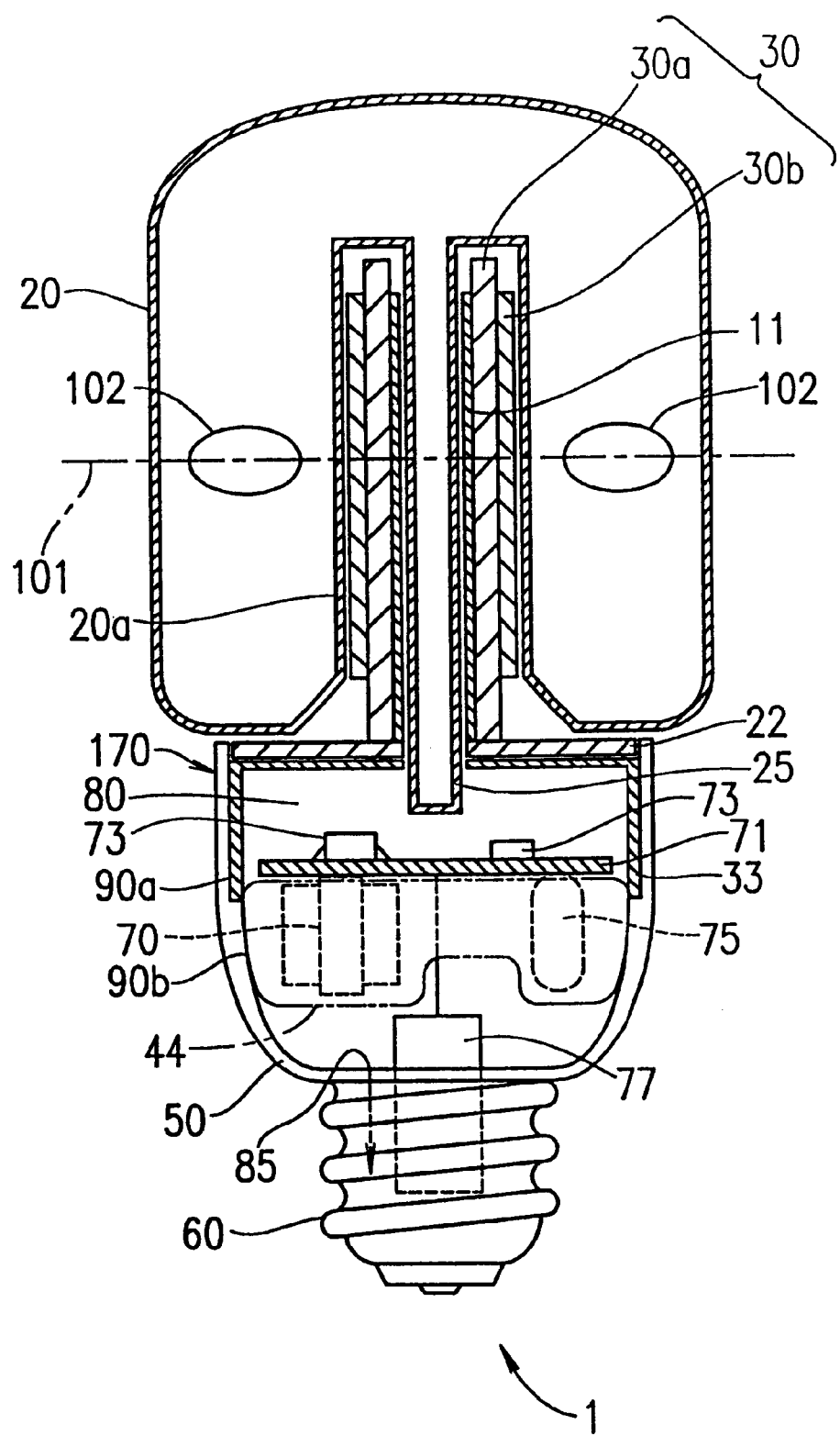
FIG. 5 shows a variation of the electrodeless discharge lamp 1 where an electrolytic capacitor 77 is positioned in the vicinity of a base 60.

FIG. 5 shows a variation of the electrodeless discharge lamp 1 where the electrolytic capacitor 77 is positioned in the vicinity of the base 60. In FIG. 5, like elements are indicated by like reference numerals used in FIG. 2, and detailed descriptions thereof are omitted.

In the example illustrated in FIG. 5, the electrolytic capacitor 77 is positioned such that at least a portion of the electrolytic capacitor 77 is within an interior space 85 of the base 60. The temperature of the interior space 85 of the base 60 is relatively low in comparison to the other positions in the electrodeless discharge lamp 1. Thus, the temperature of the electrolytic capacitor 77 can be maintained to be low during the operation of the electrolytic capacitor 77, and the lifetime of the electrolytic capacitor 77 is extended.

4. Various Positions of Stick-Shaped Heat Conducting Member

In the examples illustrated in FIGS. 2 and 5, the stick-shaped heat conducting member 11 is fitted in the hollowed portion of the magnetic core 30a of the induction coil 30. However, the stick-shaped heat conducting member 11 may be provided so as to cover the induction coil 30.

Figure 6:
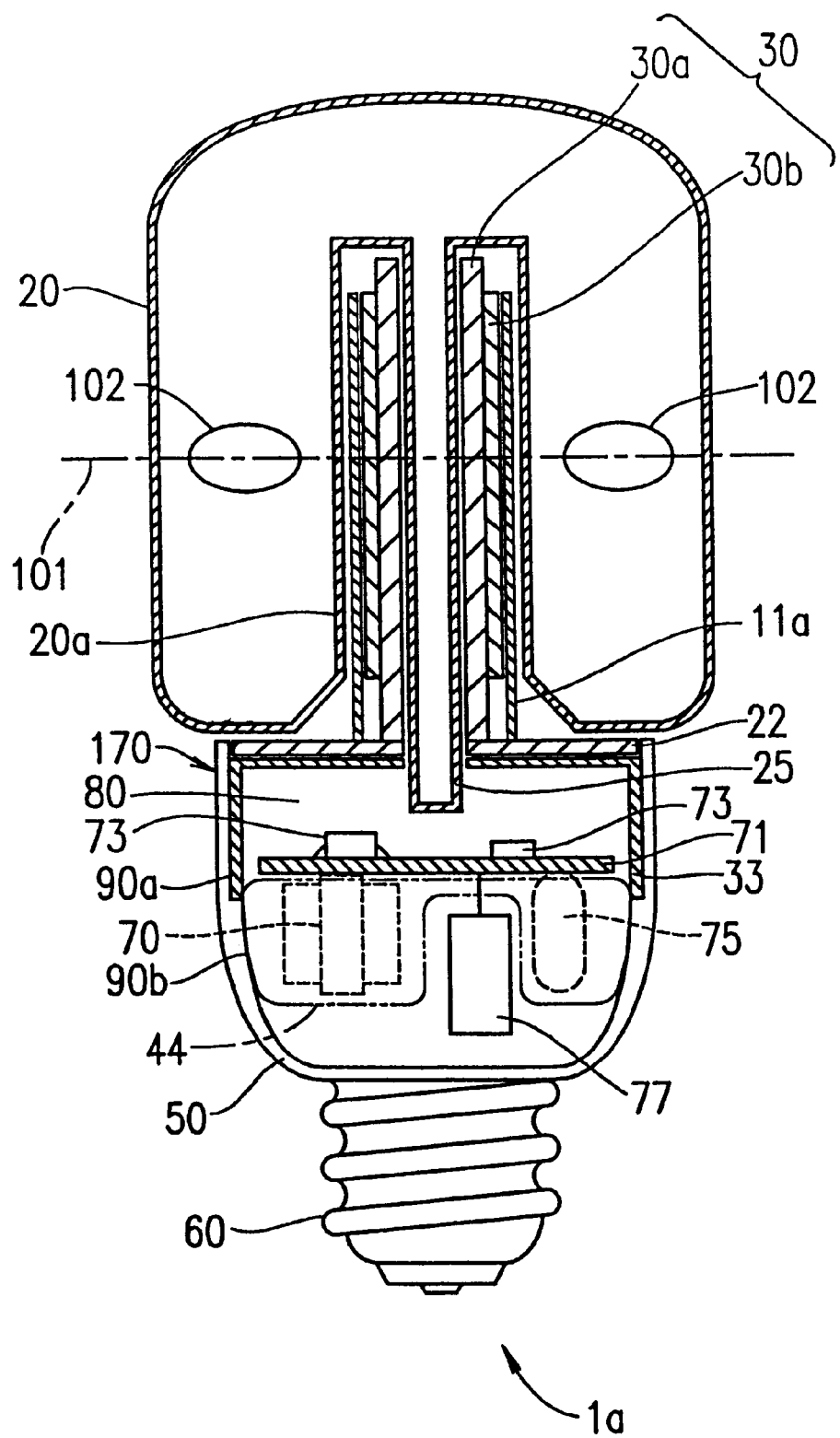
FIG. 6 shows an electrodeless discharge lamp 1a, which is a variation of embodiment 1 of the present invention.

FIG. 6 shows an electrodeless discharge lamp 1a, which is a variation of embodiment 1 of the present invention. In FIG. 6, like elements are indicated by like reference numerals used in FIG. 2, and detailed descriptions thereof are omitted.

The electrodeless discharge lamp 1a includes a stick-shaped heat conducting member 11a in place of the stick-shaped heat conducting member 11 of the electrodeless discharge lamp 1 (FIG. 2). The stick-shaped heat conducting member 11a has a hollow-cylindrical shape and is provided so as to cover the induction coil 30. That is, the stick-shaped heat conducting member 11a is provided around a coil 30b along a winding axis.

The stick-shaped heat conducting member 1a is made of a non-metal material having a high electrical insulating property and relatively high thermal conductivity. An example of such a non-metal material is, for example, alumina ceramic (insulation resistance: about $10^{16}$ Ω·m, thermal conductivity: about 3 W/m·K).

During the operation of the electrodeless discharge lamp 1a, heat which is generated from plasma 102 produced near the central portion of the induction coil 30 transfers toward the induction coil 30. The heat is transmitted to the stick-shaped heat conducting member 11a through a reentrant cavity 20a of a bulb 20. The heat transmitted from the plasma 102 to the stick-shaped heat conducting member 11a is then conducted through the stick-shaped heat conducting member 11a to the first heat conducting member 22, and then conducted through the first heat conducting member 22 to the second heat conducting member 33.

In the electrodeless discharge lamp 1a, the temperature of the induction coil 30 can be maintained to be equal to or lower than its operating limit temperature while an increase in temperature of electric components is suppressed. This is achieved according to the principles described above for the electrodeless discharge lamp 1 (FIG. 2). However, in the electrodeless discharge lamp 1a, heat produced from the plasma 102 reaches the stick-shaped heat conducting member 11a before it reaches the induction coil 30 (i.e., before the heat warms the induction coil 30). With such a structure, an increase in temperature of the induction coil 30 is efficiently suppressed.

If the stick-shaped heat conducting member 11a is made of a metal material, an electromagnetic field generated in the induction coil 30 is shielded by the stick-shaped heat conducting member 1a so that the electromagnetic field is not introduced into a discharge space inside the bulb 20. As a result, electric discharge may not occur, or occurrence of electric discharge may be difficult. Thus, a metal material is not suitable for the stick-shaped heat conducting member 11a. A preferable material of the stick-shaped heat conducting member 11a is a non-metal material having a high electrical insulating property.

A material suitable for the stick-shaped heat conducting member 11a other than alumina ceramic is, for example, aluminum nitride (thermal conductivity: about 7 W/m·K) or boron nitride (thermal conductivity: about 6 W/m·K). These materials have both a high electrical insulating property and high thermal conductivity.

A cross-section of the stick-shaped heat conducting member 11a may have a hollow cylinder shape or may have a hollow prismatic shape, so long as the stick-shaped heat conducting member 11a envelops the induction coil 30.

It is not an indispensable requirement to thermally connect the stick-shaped heat conducting member 11a and the induction coil 30, because the stick-shaped heat conducting member 11a does not serve to remove heat from the induction coil 30, but serves to prevent heat emitted from plasma from reaching the induction coil 30.

(Embodiment 2)

Figure 7:
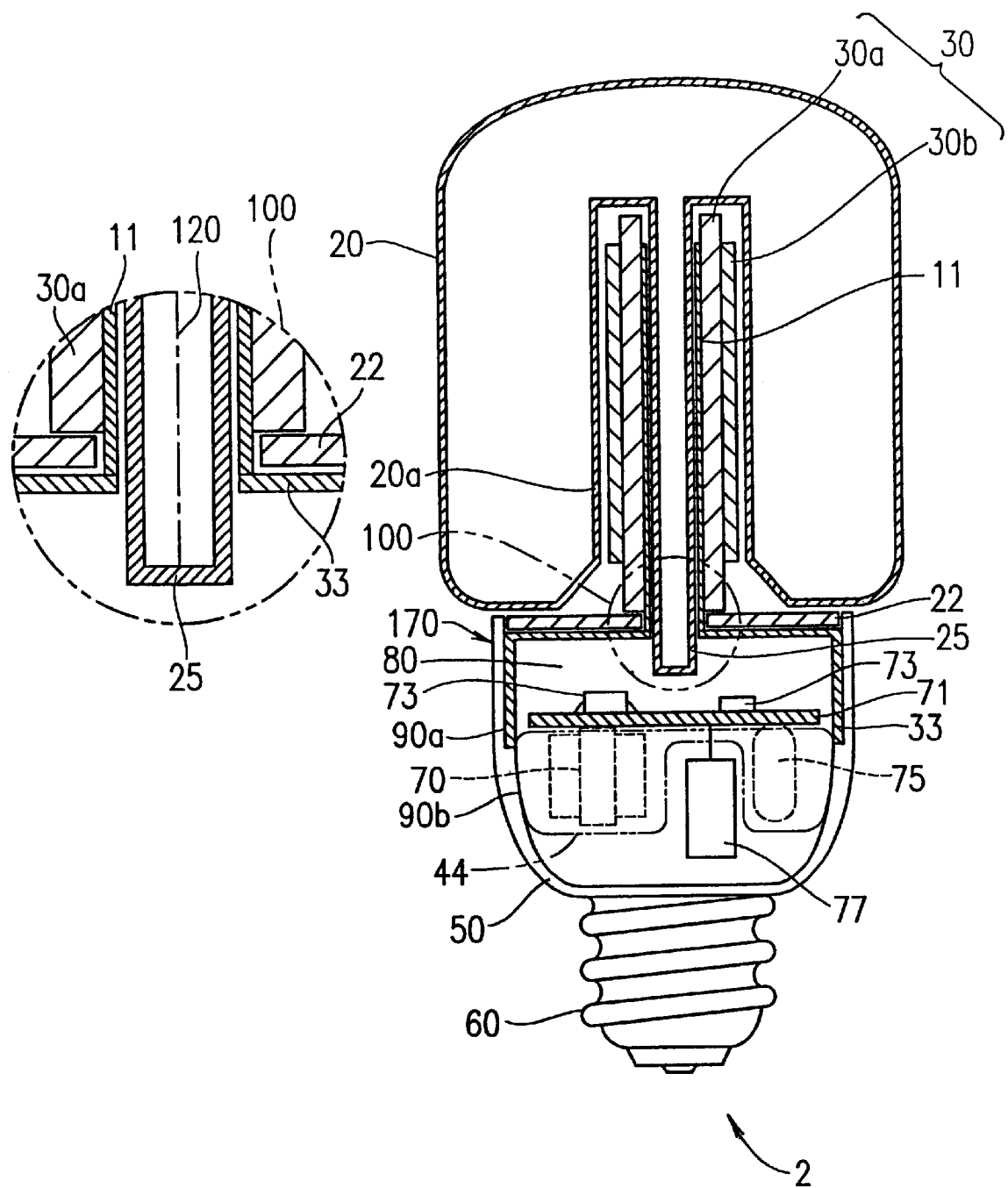
FIG. 7 shows a structure of an electrodeless discharge lamp 2 according to embodiment 2 of the present invention.

FIG. 7 shows a structure of an electrodeless discharge lamp 2 according to embodiment 2 of the present invention. In FIG. 7, like elements are indicated by like reference numerals used in FIG. 2, and detailed descriptions thereof are omitted.

The electrodeless discharge lamp 2 is different from the electrodeless discharge lamp 1 shown in FIG. 2 or the electrodeless discharge lamp 1a shown in FIG. 6 in that the stick-shaped heat conducting member 11 and the second heat conducting member 33 are thermally connected to each other at a joint portion 100.

FIG. 7 shows a partially enlarged view of the joint portion 100. The electrodeless discharge lamp 2 is designed such that a product of (the thermal conductivity of the stick-shaped heat conducting member 11)×(the area of a cross-section of the stick-shaped heat conducting member 11 which is perpendicular to the central axis of the member 11) is smaller than a product of (the thermal conductivity of the second heat conducting member 33)×(the area of a joint surface). In the partially enlarged view, the central axis of the stick-shaped heat conducting member 11 is indicated by reference numeral 120. The "joint surface" refers to a surface between the stick-shaped heat conducting member 11 and the second heat conducting member 33 in which the members 11 and 33 are in contact with each other.

The quantity of heat conducted through a material is determined by the product of the thermal conductivity, the cross-sectional area, and the thermal gradient of the material. That is, as the cross-sectional area of the stick-shaped heat conducting member 11 is decreased, the quantity of conducted heat decreases, and the temperature gradient between a highest temperature portion of the stick-shaped heat conducting member 11 (a portion of the member 11 which is closer to the plasma) and the joint portion 100 increases. That is, the temperature of the highest temperature portion increases, while the temperature of the joint portion 100 decreases. Accordingly, the temperature of the second heat conducting member 33 decreases, thereby suppressing an increase in temperature of the electric components 73 and 75. Further, by decreasing the thermal conductivity of the stick-shaped heat conducting member 11, the quantity of heat conducted through the stick-shaped heat conducting member 11 is reduced, whereby an increase in temperature of the electric components 73 and 75 is suppressed. By designing the electrodeless discharge lamp 2 such that a product of the thermal conductivity and the cross-sectional area of the stick-shaped heat conducting member 11 is smaller than a product of the thermal conductivity and the cross-sectional area (joint surface area) of the second heat conducting member 33, the heat conducting performance of the stick-shaped heat conducting member 11 becomes less than that of the second heat conducting member 33. As a result, an increase in temperature of the second heat conducting member 33 is suppressed, and accordingly, an increase in temperature of the electric components 73 and 75 is also suppressed.

In the electrodeless discharge lamp 2 according to embodiment 2 of the present invention, the temperature of the induction coil 30 can be maintained to be equal to or lower than its operating limit temperature while an increase in temperature of electric components is suppressed based on the principles that were described in conjunction with the electrodeless discharge lamp 1 (FIG. 2) of embodiment 1. However, the electrodeless discharge lamp 2 is designed such that a product of the thermal conductivity of the stick-shaped heat conducting member 11 and the area of a cross-section of the stick-shaped heat conducting member 11 which is perpendicular to the central axis of the member 11 is smaller than a product of the thermal conductivity of the second heat conducting member 33 and the area of a joint surface, whereby the "conduction-suppressing" principle (Principle A) is achieved, although in the electrodeless discharge lamp 1, the "conduction-suppressing" principle (Principle A) is achieved by setting the thermal conductivity of the first heat conducting member 22 to be lower than the thermal conductivities of the stick-shaped heat conducting member 11 and the second heat conducting member 33.

The thermal conductivity of the stick-shaped heat conducting member 11, and the area of a cross-section of the stick-shaped heat conducting member 11 which is perpendicular to the central axis of the member 11, are set such that the temperature of the induction coil 30 does not exceed the use limit temperature of the electrodeless discharge lamp 2.

In the electrodeless discharge lamp 2, the first heat conducting member 22 (e.g., ferrite disk) can be omitted. However, the first heat conducting member 22 is used in the lamp 2, the thermal conductivity of the first heat conducting member 22 is preferably set such that the quantity of heat transmitted from the stick-shaped heat conducting member 11 to the second heat conducting member 33 via the first heat conducting member 22 does not increases too much. Further, when the first heat conducting member 22 is used in the electrodeless discharge lamp 2, the member 22 is preferably made of an electrically insulative material such that an eddy current is not caused in the member 22. As described in embodiment 1, ferrite satisfies such requirements and is therefore suitable as a material of the first heat conducting member 22.

Furthermore, in the case where a magnetic material such as ferrite is used in the first heat conducting member 22, an eddy current caused in the second heat conducting member 33 due to an electromagnetic field generated by the induction coil 30, and heat emitted from the eddy current, can be reduced. Thus, ferrite is a suitable material for the first heat conducting member 22. In this case, the first heat conducting member 22 is placed between the induction coil 30 and the second heat conducting member 33, and functions as a reduction member which serves to reduce a thermal influence of an electromagnetic field generated by the induction coil 30 on the second heat conducting member 33.

In the case where the quantity of heat transmitted from the stick-shaped heat conducting member 11 to the second heat conducting member 33 is small, the second heat conducting member 33 may have a simple disk shape, i.e., the skirt portion of the "disk with a skirt" may be removed.

(Embodiment 3)

Figure 8:
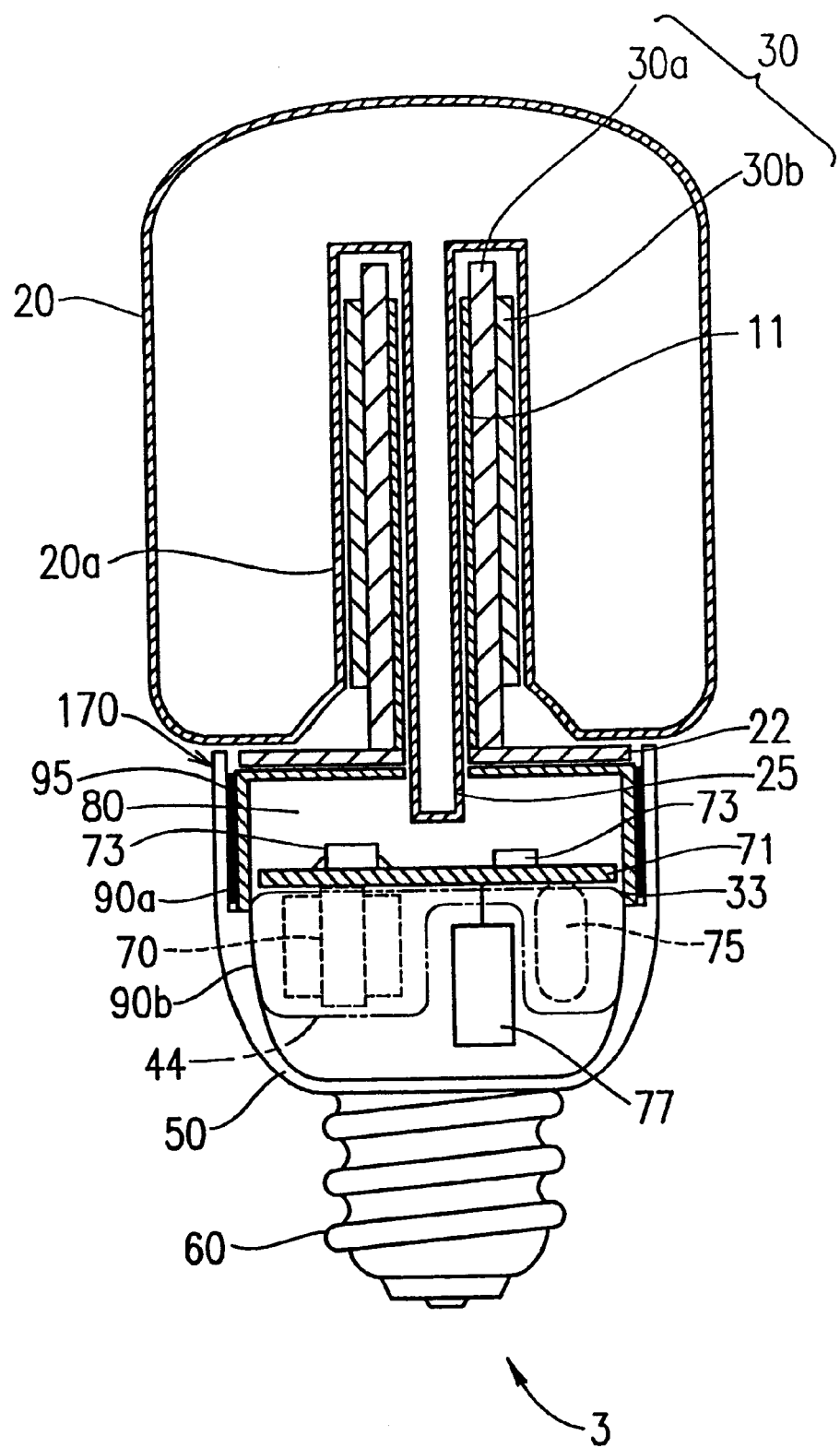
FIG. 8 shows an electrodeless discharge lamp 3 according to embodiment 3 of the present invention.

FIG. 8 shows an electrodeless discharge lamp 3 according to embodiment 3 of the present invention. In FIG. 8, like elements are indicated by like reference numerals used in FIG. 2, and detailed descriptions thereof are omitted.

In the electrodeless discharge lamp 3, a joint portion between the second heat conducting member 33 and the case 50 is filled with thermally conductive grease 95. As the thermally conductive grease 95, for example, silicon grease is suitable.

As described in embodiment 1, heat emitted from plasma is conducted through the stick-shaped heat conducting member 11, the first heat conducting member 22, and the second heat conducting member 33, so as to reach the case 50. However, the case 50 and the second heat conducting member 33 themselves do not come in contact with each other with a sufficient area of contact surface, but only at some contact points, because of roughness (small irregularities) on the surfaces of the case 50 and the second heat conducting member 33.

Figure 9A:
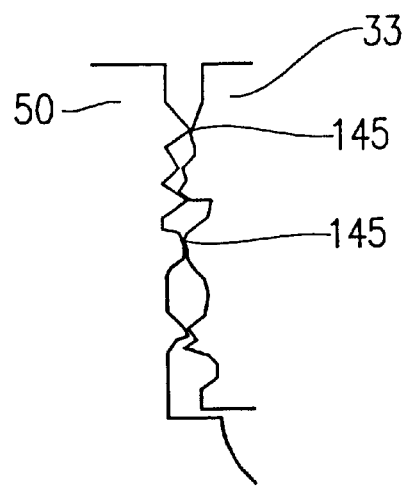
FIG. 9A schematically illustrates the state of connection between a case 50 and a second heat conducting member 33 at contact points 145.

FIG. 9A schematically illustrates the state of connection between the case 50 and the second heat conducting member 33 at contact points 145. In the contact state illustrated in FIG. 9A, the case 50 and the second heat conducting member 33 are thermally connected to each other, but transmission of heat from the second heat conducting member 33 to the case 50 is not sufficient, because the heat is transmitted through an air layer between the second heat conducting member 33 and the case 50, whose thermal conductivity is low.

Figure 9B:
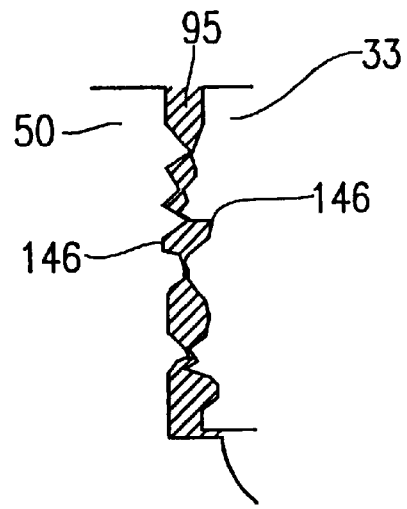
FIG. 9B schematically shows a state where a gap between the case 50 and the second heat conducting member 33 is filled with thermally conductive grease 95.

FIG. 9B schematically shows that a gap between the case 50 and the second heat conducting member 33 is filled with thermally conductive grease 95. In the contact state illustrated in FIG. 9B, the case 50 and the second heat conducting member 33 are in contact with each other even at surface contact portions 146 through the thermally conductive grease 95. In this specification, the meaning of the phrase, "the case 50 and the second heat conducting member 33 are in contact with each other at surface contact portions", includes not only when the case 50 and the member 33 are in direct contact with each other at a surface contact portion, but also when a surface contact portion of the case 50 is in contact with the thermally conductive grease 95, and a surface contact portion of the member 33 is in contact with the thermally conductive grease 95. The "surface contact portion" is not limited to an even surface.

As described above, in the electrodeless discharge lamp 3, a gap at the contact portion 90a between the case 50 and the second heat conducting member 33 is filled with the thermally conductive grease 95. In this structure, an air layer, which has a low thermal conductivity, is removed from an interface between the case 50 and the second heat conducting member 33, and accordingly, thermal contact between the case 50 and the second heat conducting member 33 is improved. As a result, heat is efficiently transmitted from the second heat conducting member 33 to the case 50 and radiated out of the case 50.

In this way, the electrodeless discharge lamp 3 of embodiment 3 achieves the objective of the present invention, i.e., "maintaining the temperature of the induction coil so as to be equal to or lower than its operating limit temperature while an increase in temperature of electric components is suppressed" based on the above-described "accelerated-radiation" principle (Principle B).

In the electrodeless discharge lamp 3 of embodiment 3, structures for achieving the "conduction-suppressing" principle (Principle A) and the "separation" principle (Principle C) are not necessarily required for attaining the objective of the present invention. For example, the thermal conductivity of each of the stick-shaped heat conducting member 11, the first heat conducting member 22, and the second heat conducting member 33, may be set to any conductivity so long as the member has a function of conducting heat. Further, the third heat conducting member 44 may be omitted from the electrodeless discharge lamp 3. Of course, it is preferable to employ the "conduction-suppressing" principle (Principle A) and the "separation" principle (Principle C) together with the "accelerated-radiation" principle (Principle B). For example, it is not indispensable but preferable to provide the third heat conducting member 44 that thermally connects at least two of a plurality of electric components.

Figure 10:
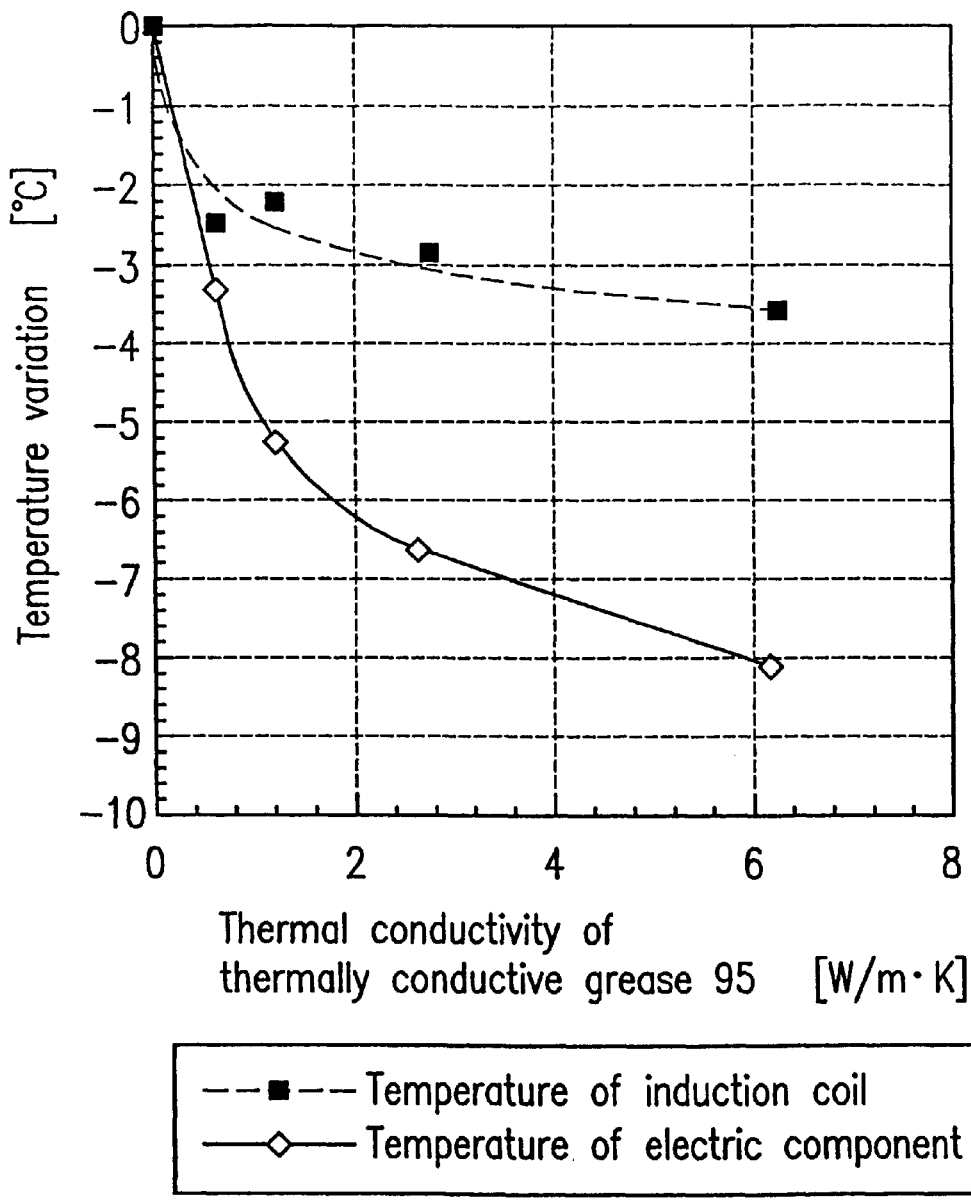
FIG. 10 shows a variation in temperature of the induction coil 30 and a variation in average temperature of electric components 73 and 75 when the thermal conductivity of the thermally conductive grease 95 is changed.

FIG. 10 shows a variation in temperature of the induction coil 30 and a variation in average temperature of the electric components 73 and 75 when the thermal conductivity of the thermally conductive grease 95 is changed. In FIG. 10, the vertical axis represents how much the temperature of the induction coil 30 or the average temperature of the electric components is decreased when the thermally conductive grease 95 is used from the reference temperature (temperature variation "0") of the induction coil 30 or the electric components that is measured when the thermally conductive grease 95 is not used. As seen from FIG. 10, by using the thermally conductive grease 95, the temperature of the induction coil 30 and the average temperature of the electric components 73 and 75 are decreased. In a generally-employed thermally conductive grease, a filler is mixed in a base material of silicon. The thermal conductivity of the thermally conductive grease varies with the type of a source material of the filler and the amount of the mixed filler. When the thermally conductive grease does not contain filler, the thermal conductivity of the thermally conductive grease is lowest at 0.2 W/m·K. As the amount of filler is increased, the thermal conductivity of the grease is increased. However, on the other hand, the viscosity of the grease becomes high, and the grease changes into a paste which is difficult to use. In view of such a problem, the upper limit of a practical thermal conductivity of the thermally conductive grease 95 is about 6 W/m·K.

In the example illustrated in FIG. 8, the second heat conducting member 33 and the case 50 are in contact with each other through the thermally conductive grease 95. Of course, the second heat conducting member 33 and the case 50 may be in direct contact with each other at a surface contact portion without intermediation of thermally conductive grease 95.

Figure 9C:
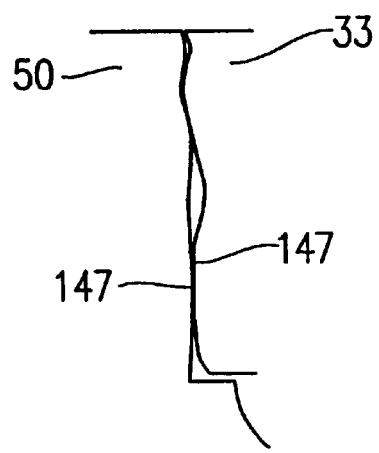
FIG. 9C schematically shows a state where the second heat conducting member 33 and the case 50 are indirect contact with each other at surface contact portions 147.

FIG. 9C schematically shows that the second heat conducting member 33 and the case 50 are in direct contact with each other at surface contact portions 147. The contact state shown in FIG. 9C is achieved by pressing the second heat conducting member 33 and the case 50 against each other. The surface contact portions 147 are pressed against each other such that small irregularities are squashed, and a relatively smooth interface is obtained between the second heat conducting member 33 and the case 50. In order to squash the small irregularities between the second heat conducting member 33 and the case 50, for example, the second heat conducting member 33 is pressed into the case 50.

Figure 11A:
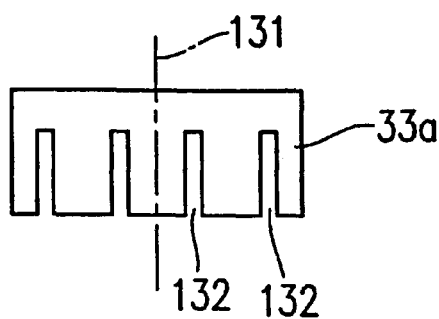
FIG. 11A shows an exemplary shape of a second heat conducting member 33a which is pressed into the case 50.

FIG. 11A shows an exemplary shape of a second heat conducting member 33a which is pressed into the case 50. The second heat conducting member 33a may be used in place of the second heat conducting member 33 shown in FIG. 8. In the case where the second heat conducting member 33a is used in the electrodeless discharge lamp 3, the objective of the present invention, i.e., "maintaining the temperature of the induction coil so as to be equal to or lower than its operating limit temperature while an increase in temperature of electric components is suppressed", can be achieved without using the thermally conductive grease 95 based on the above-described "accelerated-radiation" principle (Principle B). The second heat conducting member 33a may be made of the same material as that used for the second heat conducting member 33 described in embodiment 1.

The second heat conducting member 33a has a shape of "a disk with a skirt" where slits 132 are formed in the skirt.

Figure 11B:
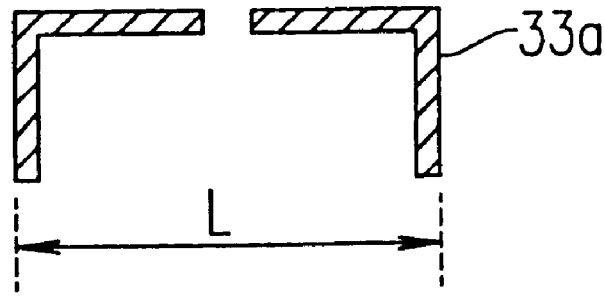
FIG. 11B is a cross-sectional view of the second heat conducting member 33a taken along the line 131 of FIG. 11A.

FIG. 11B is a cross-sectional view of the second heat conducting member 33a taken along the line 131 of FIG. 11A. The second heat conducting member 33a is designed such that the diameter L of the second heat conducting member 33a is slightly larger than the internal diameter of the case 50 at a contact portion of the case 50 and the second heat conducting member 33a. When the second heat conducting member 33a is pressed into the case 50, the slits 132 are deformed so as to fit to the inner surface of the case 50.

Figure 11C:
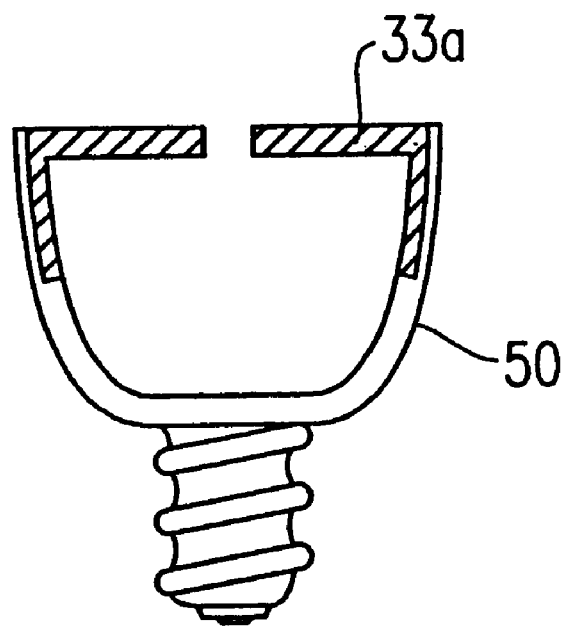

FIG. 11C shows the second heat conducting member 33a and the case 50 which has been pressed into the member 33a.

Figure 11D:
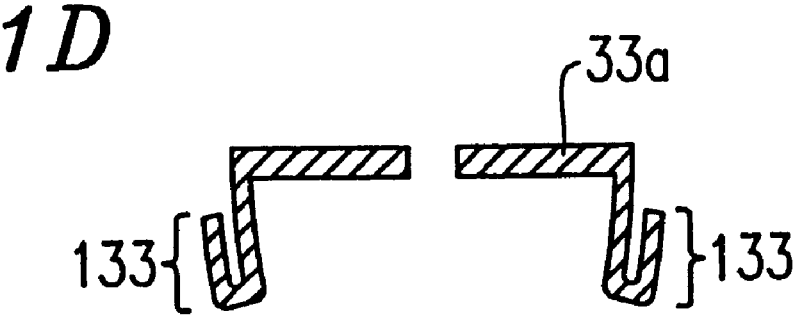

FIG. 11D shows another exemplary shape of the second heat conducting member 33a. In the example illustrated in FIG. 11D, the second heat conducting member 33a has a turned-up portion 133 at the bottom of the skirt of the "disk with a skirt". When the second heat conducting member 33a of FIG. 11D is pressed into the case 50, the turned-up portion 133 is pressed against the inner surface of the case 50, so that the second heat conducting member 33a and the case 50 may be in contact with each other at a surface contact portion. That is, a surface of the turned-up portion 133 is in contact with the inner surface of the case 50.

The above-described features of the electrodeless discharge lamps 1–3 of embodiments 1–3 may be appropriately combined so long as the objective of the present invention can be achieved. For example, in the electrodeless discharge lamp 2 (FIG. 7) of embodiment 2, a gap between the second heat conducting member 33 and the case 50 may be filled with thermally conductive grease, or at least a portion of the electrolytic capacitor 77 may be placed within the base 60.

Furthermore, in the electrodeless discharge lamp 3 (FIG. 8) of embodiment 3, at least a portion of the electrolytic capacitor 77 may be placed within the base 60.

In each of the above-described embodiments, a phosphor layer is applied on the internal surface of the bulb 20. However, the present invention is applicable, based on the above-described principles, to a discharge lamp wherein a light emitting material contained inside the bulb 20 itself radiates light directly out of the bulb 20.

In an electrodeless discharge lamp according to one aspect of the present invention, a stick-shaped heat conducting member is placed along a winding axis of an induction coil. The electrodeless discharge lamp includes a first planar heat conducting member thermally connected to the stick-shaped heat conducting member, and a second heat conducting member thermally connected to the first heat conducting member. The second heat conducting member is thermally connected to a case. The case has a surface which faces an external element of the electrodeless discharge lamp (e.g., ambient air). With such a structure, heat generated in the induction coil is conducted through the stick-shaped heat conducting member, the first heat conducting member, the second heat conducting member, and the case, so as to be radiated out of the electrodeless discharge lamp from the case. The thermal conductivity of the first heat conducting member is set to be lower than the thermal conductivity of the stick-shaped heat conducting member and the thermal conductivity of the second heat conducting member, such that the heat generated in the induction coil is not excessively transmitted to the case. Further, a third heat conducting member for thermally connecting at least two of a plurality of electric components accommodated in the case may be provided. With the third heat conducting member, the temperatures of the at least two electric components are maintained uniform. Thus, even in the case where a portion of the heat generated in the induction coil is transmitted to the case, the temperature of one of the two electric components accommodated in the case does not become excessively high in comparison to the temperature of the other electric component. As a result, the temperature of the induction coil can be maintained to be equal to or lower than its operating limit temperature while an increase in temperature of the electric components is suppressed.

In an electrodeless discharge lamp according to another aspect of the present invention, a stick-shaped heat conducting member is placed along a winding axis of an induction coil. The electrodeless discharge lamp includes a second heat conducting member thermally connected to the stick-shaped heat conducting member. The second heat conducting member is thermally connected to a case which accommodates a plurality of electric components. The case has a surface which faces an external element of the electrodeless discharge lamp (e.g., ambient air). With such a structure, heat generated in the induction coil is conducted through the stick-shaped heat conducting member, the second heat conducting member, and the case, so as to be radiated out of the electrodeless discharge lamp from the case. The second heat conducting member is thermally connected to the stick-shaped heat conducting member at a joint surface therebetween. In this structure, a product of the thermal conductivity of the stick-shaped heat conducting member and the area of a cross-section of the stick-shaped heat conducting member which is perpendicular to the central axis of the stick-shaped heat conducting member is set to be smaller than a product of the thermal conductivity of the second heat conducting member and the area of a cross-section of the second heat conducting member at the joint surface. Due to such an arrangement, the heat generated in the induction coil is not excessively transmitted to the case. Further, a third heat conducting member for thermally connecting at least two of a plurality of electric components accommodated in the case may be provided. With the third heat conducting member, the temperatures of the at least two electric components are maintained uniform. Thus, even in the case where a portion of the heat generated in the induction coil is transmitted to the case, the temperature of one of the two electric components accommodated in the case does not become excessively high in comparison to the temperature of the other electric component. As a result, the temperature of the induction coil can be maintained to be equal to or lower than its operating limit temperature while an increase in temperature of the electric components is suppressed.

In an electrodeless discharge lamp according to still another aspect of the present invention, a stick-shaped heat conducting member is placed along a winding axis of an induction coil. The electrodeless discharge lamp includes a first planar heat conducting member thermally connected to the stick-shaped heat conducting member, and a second heat conducting member thermally connected to the first heat conducting member. The second heat conducting member is thermally connected to a case which accommodates a plurality of electric components. The case has a surface which faces an external element of the electrodeless discharge lamp (e.g., ambient air). With such a structure, heat generated in the induction coil is conducted through the stick-shaped heat conducting member, the first heat conducting member, the second heat conducting member, and the case, so as to be radiated out of the electrodeless discharge lamp from the case. Further, a space is provided between a printed circuit board, on which the plurality of electric components are placed, and the second heat conducting member. Due to this space, the heat generated in the induction coil is not readily transmitted from the second heat conducting member to the electric components. Furthermore, a third heat conducting member for thermally connecting at least two of the plurality of electric components may be provided. The third heat conducting member is thermally connected to the case. With this structure, heat generated in the electric components can be radiated out of the electrodeless discharge lamp from the case. As a result, the temperature of the induction coil can be maintained to be equal to or lower than its operating limit temperature while an increase in temperature of the electric components is suppressed.

In an electrodeless discharge lamp according to still another aspect of the present invention, a stick-shaped heat conducting member is placed along a winding axis of an induction coil. The electrodeless discharge lamp includes a first planar heat conducting member thermally connected to the stick-shaped heat conducting member, and a second heat conducting member thermally connected to the first heat conducting member. The second heat conducting member is thermally connected to a case which accommodates a plurality of electric components. The case has a surface which faces an external element of the electrodeless discharge lamp (e.g., ambient air). With such a structure, heat generated in the induction coil is conducted through the stick-shaped heat conducting member, the first heat conducting member, the second heat conducting member, and the case, so as to be radiated out of the electrodeless discharge lamp from the case. The second heat conducting member and the case are in contact with each other at a surface contact portion, so that the heat generated in the induction coil is sufficiently radiated. Thus, the heat generated in the induction coil is not excessively transmitted to the plurality of electric components. As a result, the temperature of the induction coil can be maintained to be equal to or lower than its operating limit temperature while an increase in temperature of the electric components is suppressed.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An electrodeless discharge lamp, comprising:
    a bulb filled with discharge gas;
    an induction coil for generating an electromagnetic field in the bulb;
    a power supply circuit which includes a plurality of electric components and which supplies electric power to the induction coil;
    a case for accommodating the plurality of electric components, the case having a surface which faces an external element of the electrodeless discharge lamp;
    a stick-shaped heat conducting member placed along a winding axis of the induction coil;
    a first planar heat conducting member placed so as to be perpendicular to the winding axis, the first heat conducting member being thermally connected to the stick-shaped heat conducting member;
    a second heat conducting member thermally connected to the first heat conducting member; and
    a third heat conducting member for thermally connecting at least two of the plurality of electric components,
    wherein the second heat conducting member is thermally connected to the case, and
    the thermal conductivity of the first heat conducting member is lower than the thermal conductivity of the stick-shaped heat conducting member and the thermal conductivity of the second heat conducting member.

2. An electrodeless discharge lamp according to claim 1, wherein the first heat conducting member is made of an electrically insulative material.

3. An electrodeless discharge lamp according to claim 1, wherein the first heat conducting member is made of a ferrite material.

4. An electrodeless discharge lamp according to claim 1, wherein:
    the thermal conductivity of the first heat conducting member is between about 0.8 W/m·K and about 6 W/m·K inclusive; and
    the thermal conductivity of the stick-shaped heat conducting member and the second heat conducting member is between about 100 W/m·K and about 400 W/m·K inclusive.

5. An electrodeless discharge lamp according to claim 1, wherein:
    the induction coil includes a magnetic core having a hollow portion; and
    the stick-shaped heat conducting member is fitted in the hollow portion of the magnetic core.

6. An electrodeless discharge lamp according to claim 1, wherein the stick-shaped heat conducting member is provided so as to envelop the induction coil.

7. An electrodeless discharge lamp according to claim 1, wherein the case is made of a resin material.

8. An electrodeless discharge lamp according to claim 1, wherein:
    the plurality of electric components include an electrolytic capacitor; and
    the electrolytic capacitor is placed so as not to be in contact with the third heat conducting member.

9. An electrodeless discharge lamp according to claim 8, wherein:
    the case has a base for receiving a commercial electric power which is to be supplied to the plurality of electric components; and
    the electrolytic capacitor is placed such that at least a portion of the electrolytic capacitor is within the base.

10. An electrodeless discharge lamp according to claim 1, wherein the thermal conductivity of the third heat conducting member is between about 0.2 W/m·K and about 4 W/m·K inclusive.

11. An electrodeless discharge lamp, comprising:
    a bulb filled with discharge gas;
    an induction coil for generating an electromagnetic field in the bulb;
    a power supply circuit which includes a plurality of electric components and which supplies electric power to the induction coil;
    a case for accommodating the plurality of electric components, the case having a surface which faces an external element of the electrodeless discharge lamp;
    a stick-shaped heat conducting member placed along a winding axis of the induction coil;
    a second heat conducting member thermally connected to the stick-shaped heat conducting member at a joint surface; and
    a third heat conducting member for thermally connecting at least two of the plurality of electric components, wherein the second heat conducting member is thermally connected to the case, and a product of the thermal conductivity of the stick-shaped heat conducting member and the area of a cross-section of the stick-shaped heat conducting member which is perpendicular to a central axis of the stick-shaped heat conducting member is smaller than a product of the thermal conductivity of the second heat conducting member and the area of the joint surface.

12. An electrodeless discharge lamp according to claim 11, further comprising a reduction member placed between the induction coil and the second heat conducting member for reducing a thermal influence caused by an electromagnetic field generated by the induction coil on the second heat conducting member.

13. An electrodeless discharge lamp according to claim 12, wherein the reduction member is made of a ferrite material.

14. An electrodeless discharge lamp according to claim 11, wherein:

the induction coil includes a magnetic core having a hollow portion; and the stick-shaped heat conducting member is fitted in the hollow portion of the magnetic core.

15. An electrodeless discharge lamp according to claim 11, wherein the stick-shaped heat conducting member is provided so as to envelop the induction coil.

16. An electrodeless discharge lamp according to claim 11, wherein the case is made of a resin material.

17. An electrodeless discharge lamp according to claim 11, wherein:

the plurality of electric components include an electrolytic capacitor; and the electrolytic capacitor is placed so as not to be in contact with the third heat conducting member.

18. An electrodeless discharge lamp according to claim 17, wherein:

the case has a base for receiving a commercial electric power which is to be supplied to the plurality of electric components; and the electrolytic capacitor is placed such that at least a portion of the electrolytic capacitor is within the base.

19. An electrodeless discharge lamp according to claim 11, wherein the thermal conductivity of the third heat conducting member is between about 0.2 W/m·K and about 4 W/m·K inclusive.

20. An electrodeless discharge lamp, comprising:

a bulb filled with discharge gas;

an induction coil for generating an electromagnetic field in the bulb;

a power supply circuit which includes a plurality of electric components and which supplies electric power to the induction coil;

a case for accommodating the plurality of electric components, the case having a surface which faces an external element of the electrodeless discharge lamp;

a stick-shaped heat conducting member placed along a winding axis of the induction coil;

a first planar heat conducting member placed so as to be perpendicular to the winding axis, the first heat conducting member being thermally connected to the stick-shaped heat conducting member;

a second heat conducting member thermally connected to the first heat conducting member;

a third heat conducting member for thermally connecting at least two of the plurality of electric components; and a printed circuit board on which the plurality of electric components are placed, wherein the second heat conducting member is thermally connected to the case, the third heat conducting member is thermally connected to the case, and there is a space between the printed circuit board and the second heat conducting member.

21. An electrodeless discharge lamp according to claim 20, wherein:

the induction coil includes a magnetic core having a hollow portion; and the stick-shaped heat conducting member is fitted in the hollow portion of the magnetic core.

22. An electrodeless discharge lamp according to claim 20, wherein the stick-shaped heat conducting member is provided so as to envelop the induction coil.

23. An electrodeless discharge lamp according to claim 20, wherein the case is made of a resin material.

24. An electrodeless discharge lamp according to claim 20, wherein:

the plurality of electric components include an electrolytic capacitor; and the electrolytic capacitor is placed so as not to be in contact with the third heat conducting member.

25. An electrodeless discharge lamp according to claim 24, wherein:

the case has a base for receiving a commercial electric power which is to be supplied to the plurality of electric components; and the electrolytic capacitor is placed such that at least a portion of the electrolytic capacitor is within the base.

26. An electrodeless discharge lamp according to claim 20, wherein the thermal conductivity of the third heat conducting member is between about 0.2 W/m·K and about 4 W/m·K inclusive.

27. An electrodeless discharge lamp, comprising:

a bulb filled with discharge gas;

an induction coil for generating an electromagnetic field in the bulb;

a power supply circuit which includes a plurality of electric components and which supplies electric power to the induction coil;

a case for accommodating the plurality of electric components, the case having a surface which faces an external element of the electrodeless discharge lamp;

a stick-shaped heat conducting member placed along a winding axis of the induction coil;

a first planar heat conducting member placed so as to be perpendicular to the winding axis, the first heat conducting member being thermally connected to the stick-shaped heat conducting member: and a second heat conducting member thermally connected to the first heat conducting member, wherein the second heat conducting member is in contact with the case at a surface contact portion.

28. An electrodeless discharge lamp according to claim 27, further comprising a third heat conducting member for thermally connecting at least two of the plurality of electric components with each other.

29. An electrodeless discharge lamp according to claim 28, wherein the thermal conductivity of the thermally conductive grease is between about 0.2 W/m·K and about 6 W/m·K inclusive.

30. An electrodeless discharge lamp according to claim 28, wherein:
- the plurality of electric components include an electrolytic capacitor; and
- the electrolytic capacitor is placed so as not to be in contact with the third heat conducting member.

31. An electrodeless discharge lamp according to claim 30, wherein:
- the case has a base for receiving a commercial electric power which is to be supplied to the plurality of electric components; and
- the electrolytic capacitor is placed such that at least a portion of the electrolytic capacitor is within the base.

32. An electrodeless discharge lamp according to claim 28, wherein the thermal conductivity of the third heat conducting member is between about 0.2 W/m·K and about 4 W/m·K inclusive.

33. An electrodeless discharge lamp according to claim 27, wherein the second heat conducting member is pressed into the case.

34. An electrodeless discharge lamp according to claim 27, wherein the second heat conducting member is in contact with the case at the surface contact portion through thermally conductive grease.

35. An electrodeless discharge lamp according to claim 27, wherein:
- the induction coil includes a magnetic core having a hollow portion: and
- the stick-shaped heat conducting member is fitted in the hollow portion of the magnetic core.

36. An electrodeless discharge lamp according to claim 27, wherein the stick-shaped heat conducting member is provided so as to envelop the induction coil.

37. An electrodeless discharge lamp according to claim 27, wherein the case is made of a resin material.

* * * * *